United States Patent [19]

Petersen

[11] Patent Number: 4,780,217

[45] Date of Patent: Oct. 25, 1988

[54] METHOD FOR INTRODUCING OXYGEN INTO WATER AND AN APPARATUS FOR IMPLEMENTING THE SAID METHOD

[76] Inventor: Fred Petersen, Kibitzhörn 13, D-2000 Barsbüttel, Fed. Rep. of Germany

[21] Appl. No.: 25,148

[22] PCT Filed: May 6, 1986

[86] PCT No.: PCT/DE86/00185

§ 371 Date: Jan. 7, 1987

§ 102(e) Date: Jan. 7, 1987

[87] PCT Pub. No.: WO86/06712

PCT Pub. Date: Nov. 20, 1986

[30] Foreign Application Priority Data

May 7, 1985 [DE] Fed. Rep. of Germany ... 8513370[U]
May 13, 1985 [DE] Fed. Rep. of Germany ....... 3517230
Apr. 15, 1986 [DE] Fed. Rep. of Germany ... 8610203[U]

[51] Int. Cl.$^4$ ................................................ E01F 3/04
[52] U.S. Cl. ...................................... 210/758; 210/150; 210/221.2; 261/128; 261/76
[58] Field of Search .............. 210/620, 621, 622, 623, 210/624, 625, 626, 628, 629, 758, 170, 194, 198.1, 220, 221.1, 221.2, 251, 150, 747; 261/128, 133, 76, 151, 75, 28, 30, DIG. 42, DIG. 70, DIG. 79

[56] References Cited

U.S. PATENT DOCUMENTS

| | | | |
|---|---|---|---|
| 3,956,124 | 5/1976 | Fast et al. | 210/170 |
| 4,107,240 | 8/1978 | Verner et al. | 210/221.2 |
| 4,347,143 | 8/1982 | Righetti | 210/242.2 |

FOREIGN PATENT DOCUMENTS 1393028 5/1975 United Kingdom .

Primary Examiner—Frank Sever
Attorney, Agent, or Firm—Sixbey, Friedman, Leedom & Ferguson

[57] ABSTRACT

The invention relates to a method for restoring bodies of water by artificial aeration of the deep water (the hypolimnion), whereby the natural stratification of the water is maintained and no compressor is required. A pump draws the deep water in and forces it through an ejector which, in turn, draws air from the atmosphere and mixes it, in the form of finely divided bubbles, with the water. The mixture of water and air is injected into a riser-pipe in which the ascending air-bubbles produces an upwardly directed vertical flow, additional deep water being drawn in through the opening at the bottom of the riser-pipe and being brought into contact with the air-bubbles. At the top, residual air can escape into the atmosphere through the opening at the top of the riser-pipe, or through a degasification link connected thereto, whereas oxygen enriched water can be passed through a downpipe back to the hypolimnion.

23 Claims, 3 Drawing Sheets

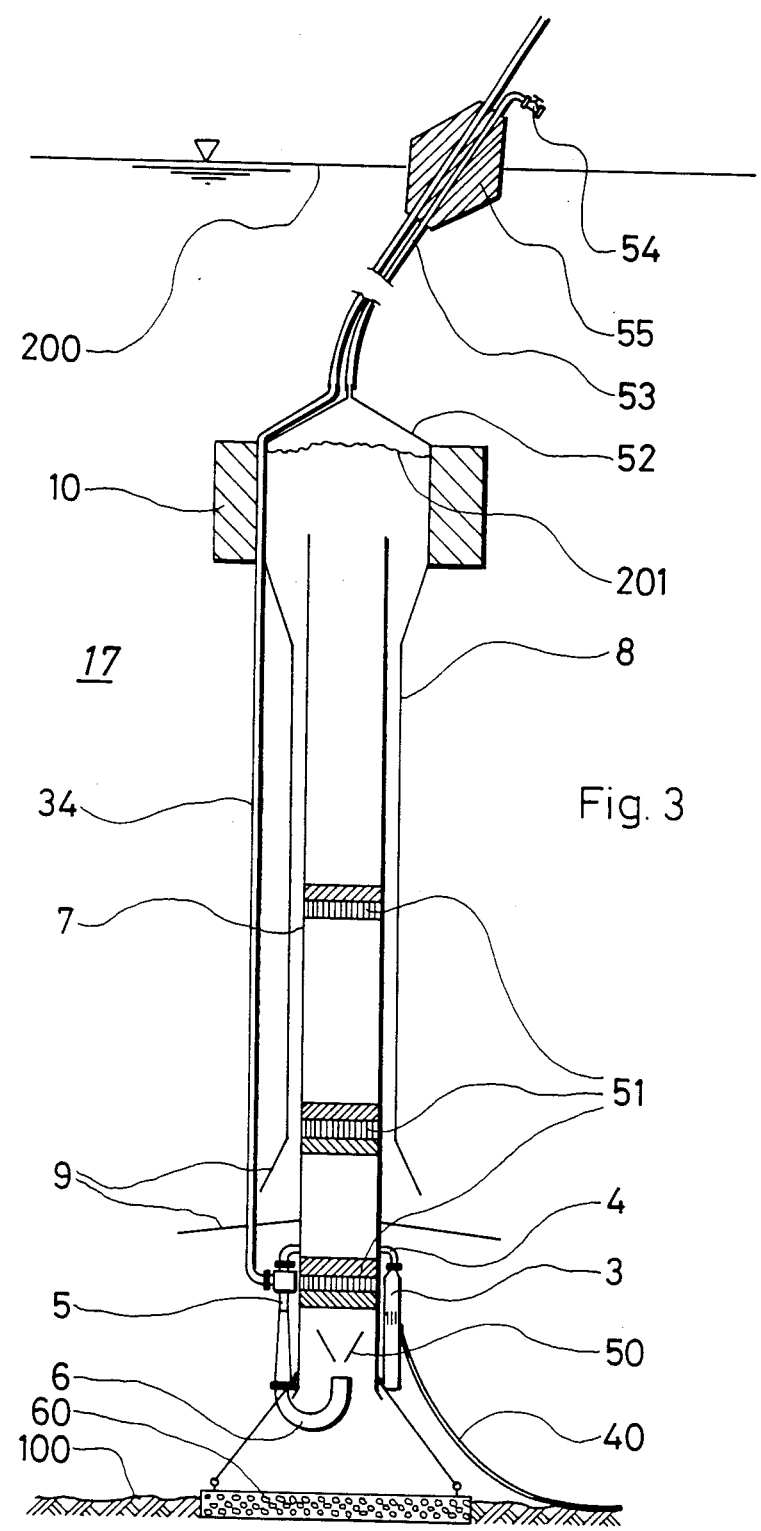

METHOD FOR INTRODUCING OXYGEN INTO WATER AND AN APPARATUS FOR IMPLEMENTING THE SAID METHOD

The invention relates to a method for introducing oxygen into water, especially naturally and artificially laid-out surface water, whereby the natural stratification of the water is maintained; and to an apparatus for implementing the said method.

The simplest way of enriching with oxygen bodies of water suffering from a lack of oxygen is to inject compressed air thereinto. For instance, perforated hoses are laid on the bottom, at particularly deep locations, and compressed air is fed into the hoses by a compressor. In this case, however, ascending air-bubbles transport water vertically, according to the principle of the air-lift pump, and this gradually breaks down the temperature-dependent water-stratification. If this process is carried out in lakes which are already largely eutrophied and, as a result of longterm anaerobiosis, possess, in the contact zone between sludge and water, an extensive layer of sludge along the bottom, there is a danger of nutrients (especially phosphates), released with the deep water carried to the surface, being transported to the trophogenic zone. This may lead to additional and even more extensive bioproduction in the upper layer of water, especially if, as a result of the aeration measures, the watertemperature of the lake is the same at all depth during the summertime, so that most of the deep water carried to the surface remains there. This produces exactly the opposite of the desired effect, bioproduction is stimulated in the body of water.

In addition to this, and especially in small lakes, transporting water low in oxygen to the surface results in fish living in the water suddenly finding water low in oxygen at all depths and thus dying from lack of oxygen. This occurs mainly when the oxygen added to the water carried to the surface is not enough for adequate oxygen enrichment within the available contact-time. Under no circumstances, therefore, should compressed air be merely introduced into highly eutrophied bodies of water.

For the purpose of overcoming these problems, an aerating device has been developed in which there is no vertical mixing of the layers of water. In this case compressed air rises, through candle-filters, in a riser-pipe. The water carried along has intensive contact with the ascending air-bubbles. Located at the top of the riser-pipe is a degasifying chamber. From here, the oxygen-enriched water is returned through a downpipe arranged concentrically around the riser-pipe and distributorpipes radiating therefrom, into the lake. The process usually takes place in the hypolimnion. Leading to the surface is only a degasifying line through which air can escape from the degasifying chamber.

The disadvantage of this method is that it must be supplied with compressed air and therefore requires a compressor. But all compressors operate very inefficiently. In addition to this, the power required to drive the air down to deep water all goes to waste. Compressors also require considerable maintenance, especially when supplying compressed air without oil, they are subject to wear, and they contribute to environmental pollution by their noise. For economic reasons, therefore, it ist often impossible to use the known method.

It is the purpose of the invention to provide a method, and an apparatus for the implementation thereof, which overcomes the problems and drawbacks of the already known methods.

According to the invention, this purpose is accomplished in that a pump draws deep water in and forces it through an injector which, in turn, draws in air from the atmosphere, mixes it with water, and then injects the mixture of water and air into a riser-pipe in which the ascending air-bubbles produce an upwardly directed vertical flow. Through the lower opening in the riser-pipe, which descends into deep water (the hypolimnion), additional deep water is drawn in and is brought, on its way upwards, into contact with the air-bubbles. The residual air, which has reached the top, can escape into the atmosphere, after releasing part of the oxygen which it contains, from the opening in the top of the riser-pipe, if the apparatus is designed as an immersion-unit through a degasifying line extending as far as the surface, whereas the water enriched with oxygen is fed to a downpipe through which it passes back to the deep water and is released, any access of surface-water to the water-circulation described being prevented.

According to another characteristic of the invention, the apparatus for the implementation of the method comprises a pump which is either designed as an immersion-pump drawing directly from the environment and arranged in the hypolimnion itself, or is connected, on the suction-side, through a suction line, to a strainer located in the hypolimnion, the pressure side of the said pump communicating with the atmosphere directly through a pressure-line or through a snorkel-line, and the outlet from the said pump opening into a mixing pipe which opens into a riser-pipe which is arranged substantially vertically and is open at the bottom, or which opens directly under the lower opening thereof, the water enriched with oxygen being adapted to be fed from the top of the riser-pipe back into a downpipe which opens into deep water, while any residuel air is adapted to escape into the atmosphere.

The centrifugal pump draws deep water from the hypolimnion and forces this water through the discharge-nozzle of an ejector. The latter draws in air and mixes it, in the form of fine bubbles, with the pressurized water. The water full of air-bubbles is forced downwardly again in a mixing pipe or hose and is released from the bottom, or from the side, into a riser-pipe, where the buoyancy of the said bubbles produces an additional upwardly directed flow. The riser-pipe is open at the bottom, the bottom opening being located in the hypolimnion. The upwardly directed vertical flow in the riser-pipe thus draws in additional deep water at a low flow-velocity, without stirring up and carrying along any deposits on the bottom of the lake. In the said riser-pipe, the finely divided air-bubbles are in intensive contact with deep water which absorbs oxygen very rapidly because it is cold and is completely unsaturated with oxygen.

The small bubbles produced in the ejector have two advantages:
 a relative large water/air contact surface is obtained;
 because of the viscosity of the water, in relation to the amount of buoyancy of each air-bubble, the said bubbles ascend slowly. This leads to a relatively lengthy period of residence in the riser-pipe and this to satisfactory oxygen exchange.

Any residuel gas escapes from the top of the riser-pipe into the atomsphere. The deep water enriched with oxygen flows through a casing, preferably arranged concentrically around the riser-pipe, back to the hypolimnion, but a separate downpipe may also be provided. At the lower of the casing or downpipe, the oxygen-enriched water flows away through a distributor, preferably laterally. The distributor prevents treated water from being drawn into the centrifugal-pump suction line, or through the riser-pipe, thus preventing a short-circuit. The treated water is distributed laterally into the body of water.

If the riser-pipe and the downpipe are arranged concentrically, the degasifying chamber is preferably designed as an extension of the casing, the diameter of the said chamber, which is larger than that of the said downpipe, being tapered conically to that of the said downpipe only below the upper outlet from the riser-pipe. This allows the velocity of the water flowing into the downpipe to be kept low, thus reducing the danger of air-bubbles being carried along into the downpipe.

The unit may be provided at the top with a float-element, so that it automatically floats vertically and at the correct height in relation to the surface of the water. The floating unit can easily be moved to another location.

The unit is anchored at the location where it is to be used. This may be effected by means of a single anchor-line at the bottom of the unit, the said line running upwardly, for example through the riser-pipe or through an eye at the bottom of the unit. If the float-element is large enough to carry the anchor, the latter may be lifted, merely by a manually operated winch, for example, in order to move the unit to another location.

The unit may, of course, also be anchored conventionally, e.g. by means of two or three anchors with lines secured directly to the float-element.

In order to be able to transport the unit almost horizontally in shallow water, near the shore, the lower end thereof may be provided with a second float-element which may be inflastable or may be a fixed tank adapted to be inflated with compressed air. A plurality of separate float-elements may also be arranged at the lower end of the unit. There should at least be an emergency line secured to the lower end of the unit, making it possible to lift the lower end with an auxiliary vehicle and thus to position the unit horizontally.

The submerged configuration of the unit is particularly advantagegeous, since it is unobtrusive and is not affected by ice. Furthermore, the submerged installation eliminates the danger to shipping. In the case of a submerged unit, the degasifying chamber must be closed at the top, with only a degasifying line running to the surface of the water, where the said degasifying line, and the snorkel line which supplies air to the ejector, may be supported by a buoy or some other float-element. The arrangement of an adjustable throttle-valve in the degasifying line permits sensitive adjustment of waste-gas counterpressure, so that a cushion of gas forms, in the upper part of the degasifying chamber, over a free surface. This results in very effective degasifying and prevents water from being carried into the degasifying line.

Form the point of view of power, the unit operates very efficiently. When suitably designed, the ejector produces small, uniformly distributed air-bubbles which provide intensive gas-exchange even in the mixing pipe. Additional oxygen may be taken from these bubbles in the riser-pipe, because of their relatively long period of residence therein. The kinetic energy of the mixing jet, originally applied by the pump, does not go to waste. Instead it produces intensive vortexing of the mixture of water and air, thus improving the gas-exchange still further, and it is also used to draw additional deep water in through the riser-pipe which is open at the bottom. The method in question operates particularly effectively with a low pressure pump and a relatively small amount of air in the mixing line.

The method may be modified to permit the use of a small and inexpensive high-pressure installation which reduces the dimensions of the unit. In this case, the air at the bottom of the riser-pipe is distributed roughly, by a flow-guidance device, over the entire cross-section of the pipe. One or more static mixers are then arranged at the top. These divide the air into very small bubbles and ensure homogeneous mixing. This makes it less important to produce particularly small bubbles with the ejector. The latter permits a large amount of air in the mixture produced by the ejector. A mixture of this kind can be prodcued efficiently with a high-pressure ejector which is relatively compact and can be supplied with operating water by a correspondingly small high-pressure pump.

The said static mixers are usually distributed in several stages over the length of the riser-pipe. As a result of this, the air-bubbles, which expand because of the decreasing static pressure on the way up, are again divided, thus providing a very large contact area with the water in relation to total volume. The flow-resistance of the static mixers slows down the upwardly directed flow, resulting in a longer period of residence for the air in the riser-pipe. This again promotes the exchange of oxygen very considerably.

As compared with the apparatus described at the beginning hereof as state of the art, and operating primarily with a compressor, the aerating apparatus according to the invention has the major advantage of operating primarily with a centrifugal pump. Centrifugal pumps are highly efficient, almost maintenance-free, simple and reliable machines. As compared with a compressor for oil-free compressed air, they are extremely inexpensive and exhibit scarcely any wear. They are also quiet, not harmful to the environment, and can furthermore be integrated into the aerating unit. A shore-lot with a compressor-station is not needed.

Additional characteristics of the invention are described in the dependent claims and are explained in greater detail in conjunction with the example of embodiments of an apparatus for implementing the aerating method according to the inventions illustrated in the drawings attached hereto, wherein the similar structural elements have been identified with the same reference numerals.

In these drawings:

FIG. 3 shows an apparatus with static mixers in diagrammatical cross-section.

Figure 1:
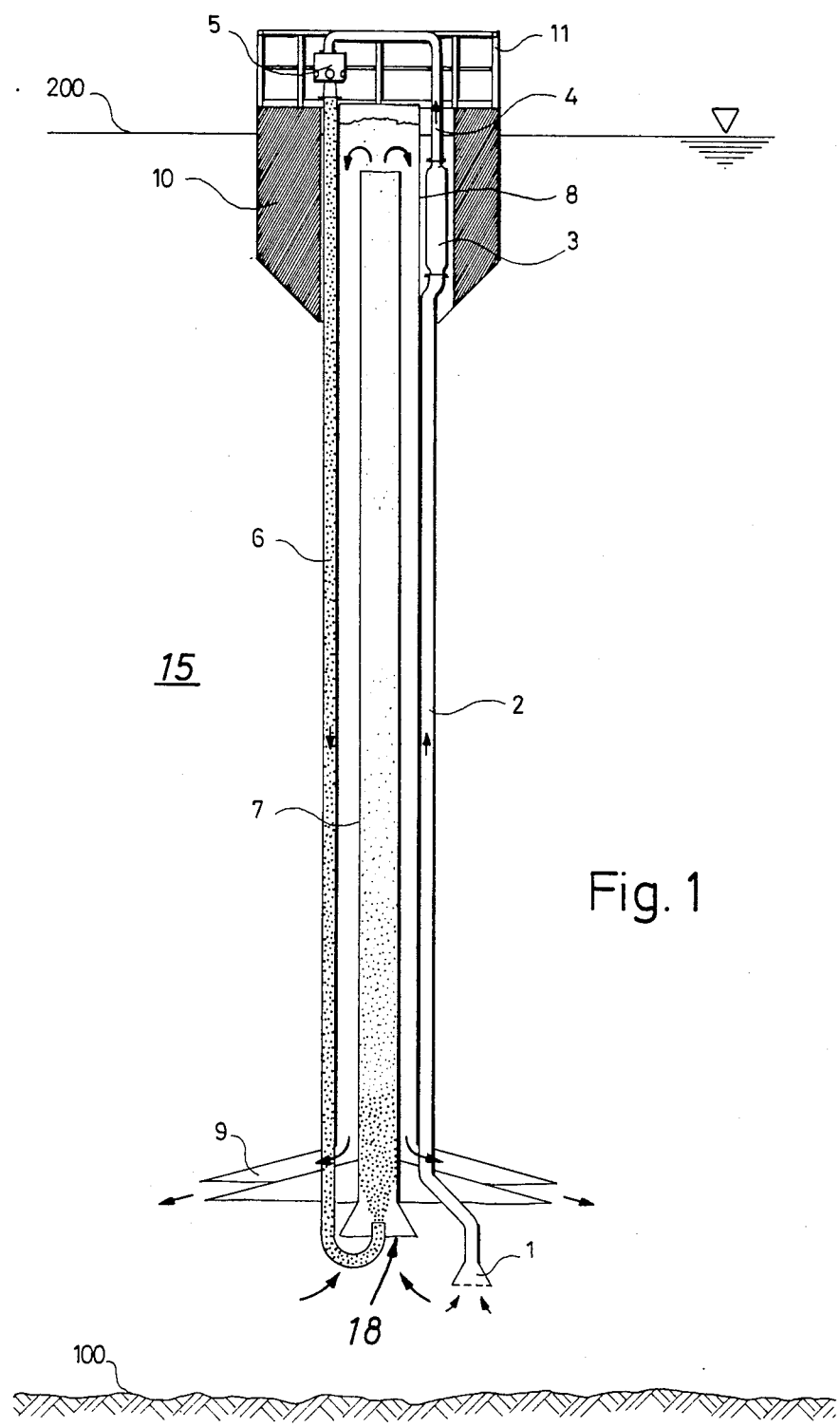
FIGS. 1 and 2 shows two apparatuses with differently arranged pumps in diagrammatical cross-section.

FIG. 1 shows quite a large apparatus 15 having a float-element 10 large enough to stand on. In the interests of safety, the platform on the float-element is surrounded by a rail 11 located above the level 200 of the water. Strainer 1 is located in deep water, below the distributor and at a distance from the lake-bottom 100. Suction-pipe 2 runs from strainer 1 to pump 3 which is shown as a tubular immersion-pump. Pressure-line 4 runs to ejector 5, the air bubbles admixed here being shown in the drawing as dots. Mixing pipe 6 carries the water interspersed with bubbles downwardly and enters riser-pipe 7 from below. The lower end of the riser-pipe is funnel-shaped. Additional deep water is drawn in at this point. At the top, the oxygen-enriched water flows over the edge of riser-pipe 7 into descending pipe 8 in which it flows down, leaving the apparatus laterally through distributor 9.

The latter may consist either of two discs arranged one above the other which, as shown, may be slightly conical, or of a series of radially arranged pipes. Residual gas escapes into the atmosphere from descending pipe 8 which is open at the top.

Pump 3 is normally driven electrically by a power-supply cable, not shown. Also not shown, for the sake of clarity, is the anchoring device which may be designed in a manner generally known.

Figure 2:
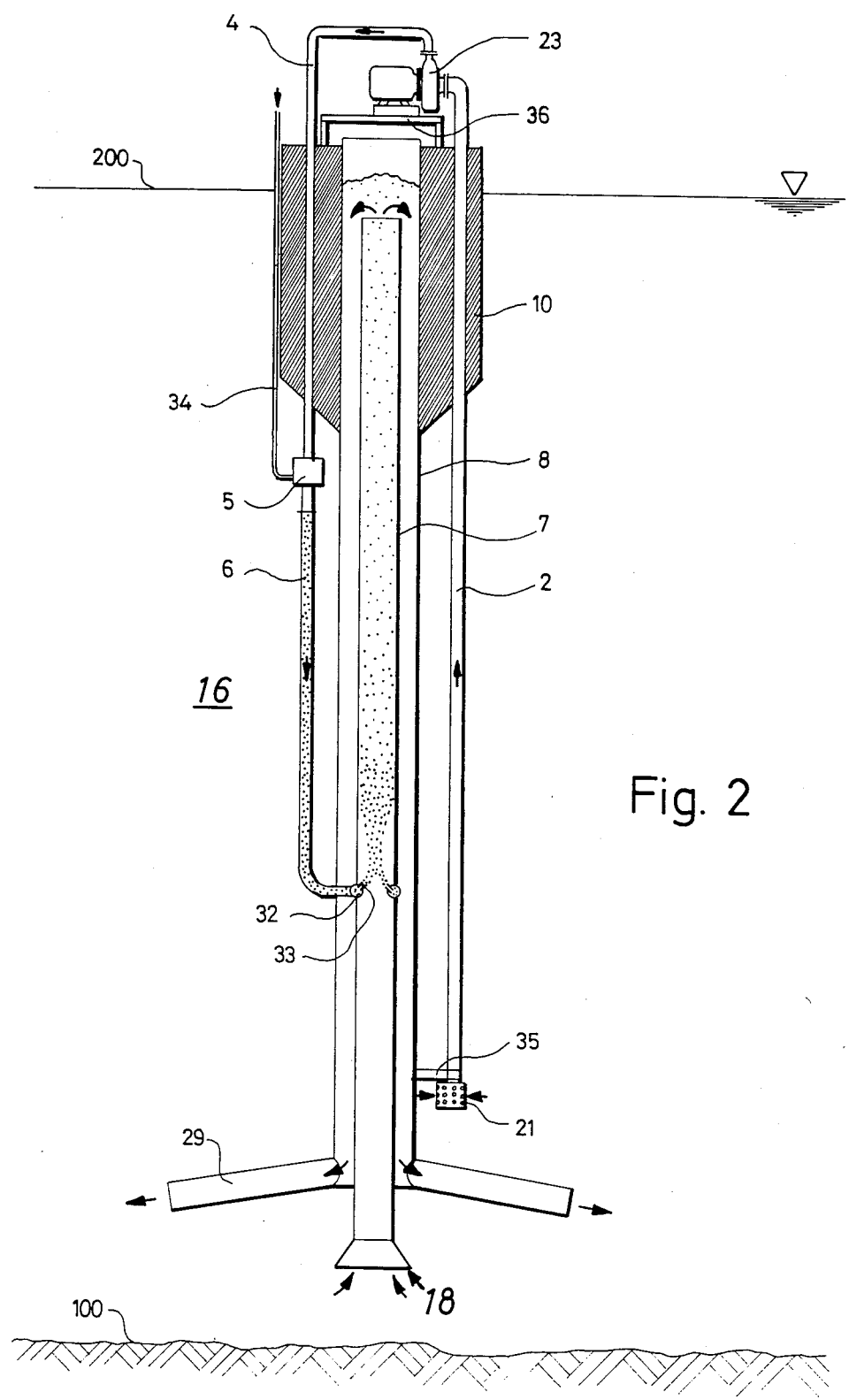

FIG. 2 shows another apparatus 16 in which strainer 21 is designed to draw water in laterally and is secured, by a mounting 35, to descending pipe 8 above distributor 29. Suction-pipe 2 then runs to pump 23 which is arranged upon a base 36 in float-element 10 and is in the form of a particularly inexpensive centrifugal pump, preferably an electrically driven block-standard-pump, preferably designed to be self-priming. Pressure-line 4 runs to ejector 5 which is now arranged under the water and which draws in the air to be admixed through a snorkel-line 34. Mixing pipe 6 carries the water interspersed with bubble downwardly to an annular duct 32 surrounding riser-pipe 7, the mixture of air and water being ejected from the said duct, through nozzles 33, into the said riser-pipe. The individual nozzles may also be replaced by an annular slotted nozzle. It is desirable for the nozzles to be directed obliquely upwardly. This, in conjunction with the air-lift-pump effect of the ascending air-bubbles, causes additional deep water to be drawn in through the lower opening riser-pipe 7. The process operates as described in conjunction with FIG. 1 until the oxygen-enriched water flows away, as shown by the arrows, laterally from distributor 29 which, in this case, consists of radially arranged pipes.

The design according to FIG. 2 is particularly suitable for use with low-pressure pump units and very deep bodies of water. In this case, the mixture of air and water must not be forced all the way down to the lower end of riser-pipe 7. The ejector may also be arranged below the level of the water, the supply of air being drawn in through a snorkel-line 34.

FIG. 3. shows a design in which apparatus 17 is submerged and comprises a high-pressure pump-unit. Pump 3 is in the form of an electrically driven immersion-pump which is supplied with power through an underwater cable 40. The ejector is supplied with operating water through pressure-line 4 which, in the drawing, passes round the back of riser-pipe 7. Snorkel-line 34 supplies the ejector with atmospheric air. Mixing pipe 6 carries the mixture of air an water thus obtained into the said riser-pipe from below where it impinges upon the preferably conically designed flow-guidance device 50 which destributes it roughly over the entire cross-section of the said riser-pipe.

Static mixers 51 are arranged in spaced relationship to each other in riser-pipe 7. They break down the ascending air-bubbles and homogenize the mixture. At the top, the oxygen-enriched water flows over the edge of riser-pipe 7 into descending pipe 8 in which it flows downwardly and laterally out of distributor 9 at a sharply reduced flow velocity.

The said static mixers may be in the form of corrugated plates forming open, intersecting channels. Shear-forces between the said plates produce little bubbles. This results in constant renewal of the interface by the meeting of bubbles and formation of new bubbles. Bubbles of the desired specific size may be obtained by appropriate design of the mixing-element geometry. It is also possible to use as static mixers an arrangement of drippers in riser-pipe 7 which also promote homogeneous distribution of airbubbles over the cross-section of the pipe.

Residual gas escapes, over free surface 201, into degasifying chamber 52 and is blown out into the atmosphere through waste-gas line 53 and valve 54 which is in the form of a throttle-valve. The end of the said waste-gas line is held at surface 200 of the water by means of a float element 55 which also supports snorkel-line 34.

The apparatus 17 is located on top of the float element 10 which is designed to provide sufficient buoyancy. The bottom is secured to an anchor-block which holds it under water. Anchor-block 60 lies on the bottom 100 of the lake. In all of the drawings, the component-connecting elements are generally known and, for the sake of clarity, they are not shown.

I claim:

1. A method for introducing oxygen from air into water, especially into surface-water, whereby the natural stratification of the water is maintained, and by which air-bubbles ascending within a riser-pipe produce an upwardly directed vertical flow, deep water being drawn in through a lower opening in the riser-pipe which extends down into the deep water (the hypolimnion), and being brought into contact with the air-bubbles on its way up, residual air which has reached the top of the riser-pipe being able to escape to the atmosphere, after releasing part of the oxygen which it contains, from an opening in the top of the riser-pipe, comprising providing an alternative to the use of a compressor for oxygenating a hypolimnion by the steps of immersing an immersion-unit in the water while leaving a degasifying line thereof projecting from the surface of the water, feeding water enriched with oxygen to a descending pipe and passing it through the descending pipe back to the deep water while preventing any access of surface water to the descending pipe, drawing deep water into the riser-pipe and forcing it through an ejector from outside of the riser-pipe via a pump and an ejector, drawing air from the atmosphere, mixing the air with the water and injecting the air and water into the riser-pipe as a water/air mixture.

2. A method according to claim 1, comprising the step of causing the water and air injected into the riser-pipe to flow through at least one static mixer while it ascends within the riser-pipe.

3. A method according to claim 2, wherein the injecting step includes causing the water/air mixture to be conducted from an orifice of a mixing pipe through a flow guidance device, that flares outwardly in a direction of flow therethrough, into the riser-pipe, whereby the air-bubbles within the water/air-mixture are distributed above the cross-section of the riser-pipe before the static mixer.

4. A method according to claim 1, wherein the injecting step includes the water/air mixture being blown via a jet into the riser-pipe.

5. A method according to claim 4, wherein an annular jet is used to inject the water/air mixture into the riser-pipe.

6. An apparatus providing an alternative to compressors for introducing oxygen from atmospheric air into a hypolimnion without disrupting the natural stratification thereof, comprising a vertical riser-pipe; a pump for feeding deep water upwardly through the vertical riser-pipe; an ejector for suctioning atmospheric air; a mixing pipe for charging a water/air mixture into deep water ascending within the riser-pipe from the hypolimnion; wherein the pump is arranged outside of the riser-pipe and the outlet of the ejector is connected with the mixing pipe; wherein the mixing pipe opens into the riser-pipe; wherein a descending pipe is provided through which the water being enriched with oxygen is fed back into the hypolimnion; and wherein an outlet is provided to enable residual air to escape from the apparatus into the atmosphere.

7. An apparatus according to claim 6, wherein said pump is an immersion pump that draws directly from its immediate environment and is located in the hypolimnion.

8. An apparatus according to claim 6, wherein said pump has a suction-side connected, through a suction-line, to a strainer located in the hypolimnion, and a pressure-side connected through a pressure-line to the ejector.

9. An apparatus according to claim 8, wherein the ejector is connected to the atmosphere through a snorkel-line.

10. An apparatus according to claim 8, wherein the ejector is directly connected to the atmosphere.

11. An apparatus according to claim 8, wherein the strainer is arranged within the hypolimnion at a different level than the distributor.

12. An apparatus according to claim 6, wherein the descending pipe, through which water enriched with oxygen passes back to the hypolimnion, surrounds the riser-pipe.

13. An apparatus according to claim 12, wherein a degasifying chamber is formed as an extension of the descending pipe and has a diameter that is larger than the diameter of the said descending pipe in areas above an upper outlet from the riser-pipe and reducing to that of the said descending pipe only below the upper outlet from the riser-pipe.

14. An apparatus according to claim 12, wherein an upper end of the descending pipe and of a degasifying chamber project from the surface of the water, whereas the riser-pipe terminates below the surface of the water within said descending-pipe and degasifying chamber, so that water ascending in the riser-pipe flows over an edge of the riser-pipe into the said descending pipe, while ascending residual gas can escape freely into the atmosphere.

15. An apparatus according to claim 12, wherein a distributor is located at a lower end of the descending pipe, said distributor comprising two discs arranged horizontally one above the other.

16. An apparatus according to claim 15, wherein said discs are slightly conical in shape.

17. An apparatus according to claim 6, wherein the mixing pipe opens into the riser-pipe via an annular duct jet.

18. An apparatus according to claim 17, wherein said annular duct jet has nozzles directed obliquely upwardly.

19. An apparatus according to claim 6, wherein at least one static mixer is arranged in the riser-pipe.

20. An apparatus according to claim 6, wherein a flow guidance device is arranged above an opening of the mixing pipe into the riser pipe, said flow guidance device flaring outwardly in a direction of flow therethrough.

21. An apparatus according to claim 6, wherein the water-air mixture is injected into the riser-pipe at a central location thereof.

22. An apparatus according to claim 6, wherein a float-element is connected at an upper end of the apparatus for enabling it to float on the water.

23. An apparatus according to claim 22, wherein the apparatus is anchored to an anchor block via an anchor line.

* * * * *